United States Patent [19]

Lees et al.

[11] Patent Number: 5,380,804
[45] Date of Patent: Jan. 10, 1995

[54] 1,3,5-TRIS-(2-CARBOXYETHYL) ISOCYANURATE CROSSLINKING AGENT FOR POLYEPOXIDE COATINGS

[75] Inventors: Robert G. Lees, Stamford, Conn.; Charles A. Zezza, Mahwah, N.J.

[73] Assignee: Cytec Technology Corp., Wilmington, Del.

[21] Appl. No.: 13,593

[22] Filed: Jan. 27, 1993

[51] Int. Cl.$^6$ .............. C08F 16/26; C08F 20/32; C08F 24/00
[52] U.S. Cl. .............. 525/327.3; 525/934; 528/114; 528/367
[58] Field of Search .............. 525/327.3, 934; 528/114, 367

[56] References Cited

U.S. PATENT DOCUMENTS

| | | | |
|---|---|---|---|
| 3,235,553 | 2/1966 | Sadle | 260/248 |
| 3,485,833 | 12/1969 | Sadle | 528/367 |
| 3,730,930 | 5/1973 | Labana et al. | 260/23 |
| 3,752,870 | 8/1973 | Labana et al. | 260/836 |
| 3,781,380 | 12/1973 | Labana et al. | 260/836 |
| 3,787,521 | 1/1974 | Labana et al. | 260/836 |
| 4,011,381 | 3/1977 | Iwasawa et al. | 525/327.3 |
| 4,181,642 | 1/1980 | VanderLans | 156/121 |
| 4,346,144 | 8/1982 | Craven | 428/335 |
| 4,650,718 | 3/1987 | Simpson et al. | 428/413 |
| 4,681,811 | 7/1987 | Simpson et al. | 428/413 |
| 4,703,101 | 10/1987 | Singer et al. | 528/87 |
| 4,764,430 | 8/1988 | Blackburn et al. | 428/413 |
| 5,116,892 | 5/1992 | Barbee et al. | 524/99 |

FOREIGN PATENT DOCUMENTS

| | | |
|---|---|---|
| 256369 | 2/1988 | European Pat. Off. . |
| 480120 | 4/1992 | European Pat. Off. . |
| 59-107742 | 6/1984 | Japan . |
| 61-087767 | 5/1986 | Japan . |
| 61-087768 | 5/1986 | Japan . |
| 61-087769 | 5/1986 | Japan . |
| 9219660 | 11/1992 | WIPO . |

OTHER PUBLICATIONS

Chemical Abstract 101:234352x, "Binder for Molding Sand".
Sarzhevskaya, V. P., et al., "Curing of Epoxy Resins with 1,3,5-Tricarboxyethyl Isocyanurate", Khim. Tekhnol., No. 3, pp. 36-39 (1976).
Fedorenko, V. P., et al., "Hardening of an Epoxy Resin by Carboxyethyl Isocyanurates", Sin Fiz.-Khim. Polim., vol. 13, pp. 41-43 (1974).
Rokaszewski, E., "Kinetics and Mechanism of Reactions of Alkene Oxides With Carboxylic Groups in Protophilic Solvent", Pol. J. Chem., vol. 52, No. 7-8, pp. 1487-1494 (1978).

Primary Examiner—Frederick Krass
Attorney, Agent, or Firm—Bart E. Lerman; Michael J. Kelly; Claire M. Schultz

[57] ABSTRACT

Novel curable compositions based on carboxy/epoxy chemistry and cured coatings produced thereby are provided. The curable compositions employ 1,3,5-tris-(2-carboxyethyl)isocyanurate as the polybasic carboxylic acid crosslinker. The crosslinker is combined with a polyepoxide such as those obtained by copolymerizing glycidyl methacrylate with one or more epoxy-free olefinically-unsaturated monomers. The polyepoxide typically has a molecular weight of about 1,000 to about 30,000, an epoxy equivalent weight of about 50 to about 5,000, and a glass transition temperature of about 10° C. to about 120° C. A cure catalyst such as triphenyl phosphine is also used. Heat curing the compositions of the invention produces hard films useful as chip-, scratch- and mar- resistant coatings for automotive applications and as general use coatings for industrial applications.

17 Claims, No Drawings

1,3,5-TRIS-(2-CARBOXYETHYL) ISOCYANURATE CROSSLINKING AGENT FOR POLYEPOXIDE COATINGS

BACKGROUND OF THE INVENTION

1. Field of the Invention

This invention relates to the preparation of cured polyepoxide coatings using 1,3,5-tris-(2-carboxyethyl) isocyanurate as a crosslinking agent.

2. Description of the Related Art

Coatings prepared by curing polyepoxides with polybasic acid compounds have been described in European Patent No. 480,120; U.S. Pat. Nos. 4,346,144; 4,764,430; 4,681,811; 4,650,718; 4,703,101; 3,787,521; 3,781,380; 3,752,870; 3,730,930; and 4,181,642, and Japanese Patent Nos. 59-107,742; 61-087,767; 61-087,768; and 61-087,769. Reaction of polyepoxides with polybasic acids are further disclosed in the following references: Khim. Tekhnol., No. 3, pages 36 to 39 (1976); Sin. Fiz.-Khim. Polim., Volume 13, pages 41 to 43 (1974); and Pol. J. Chem. Volume 52, Number 7-8, pages 1487 to 1494 (1978).

Coatings prepared by the above-mentioned methods have, in some cases, advantages such as distinctness of image, adhesion and gloss, as disclosed, for example, in the U.S. patents cited above. These coatings, however, suffer from poor solvent resistance and also from poor appearance which is the result of bubbles in the surface of the coating. While introduction of a long chain monocarboxylic acid into the coating may reduce the amount of bubbles popping in the surface of the coating, it also reduces the crosslink density of the coating, thereby reducing the resistance properties of the cured films.

Similarly, for example, even though coatings disclosed in European Patent No. 480,120 have the desirable property of scratch resistance, they also have undesirable properties such as poor gloss. They also require high temperatures to cure.

It is an object of this invention to provide a low temperature curing composition which produces coatings having exceptional solvent resistance and hardness, and, at the same time, having a good balance of other film and resistance properties such as high gloss, and good humidity and salt spray resistance. Hard coatings are particularly useful as chip-, scratch- and mar- resistant automotive coatings and also as general use industrial coatings.

SUMMARY OF THE INVENTION

This invention is a curable composition comprising:
(i) 1,3,5-tris-(2-carboxyethyl) isocyanurate;
(ii) a polyepoxide; and optionally
(iii) a cure catalyst.

When cured, the novel composition of the invention produces coatings which have exceptional hardness and solvent resistance.

The cured coatings of this invention, due to their hardness, have the advantage of being particularly useful as chip-, scratch- and mar-resistant coatings for automotive applications and as general use coatings for industrial applications.

DETAILED DESCRIPTION OF THE PREFERRED EMBODIMENTS

Described herein is a novel curable composition, comprising:
(i) 1,3,5-tris-(2-carboxyethyl) isocyanurate crosslinker;
(ii) a polyepoxide; and optionally
(iii) a cure catalyst.

When cured, the composition of the invention produces coatings particularly useful in automotive and industrial applications.

The Crosslinker

The crosslinking agent used in the curable composition of the invention comprises 1,3,5-tris-(2-carboxyethyl) isocyanurate, hereinafter TCI, and is represented by the formula:

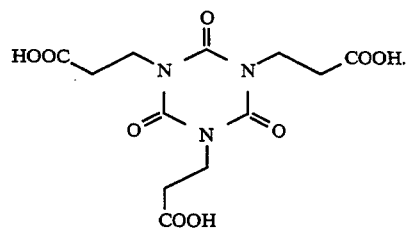

The crosslinker may be prepared from cyanuric acid and acrylonitrile by the procedure described in U.S. Pat. Nos. 3,485,833 and 3,235,553.

The Polyepoxide

The polyepoxides usable in this invention are compounds which contain at least two epoxy functionalities per each polyepoxide and include monomeric polyepoxides, dimeric polyepoxides, trimeric, tetrameric, and higher oligomeric polyepoxides, and polymeric polyepoxides. Thus, the term "polyepoxide" in the context of this invention refers to an anchor molecule having a plurality of epoxy functionalities, wherein the anchor is any monomeric, dimeric, trimeric, tetrameric, higher oligomer, or polymeric moiety capable of forming chemical bonds with epoxides or epoxyfunctional groups. The polyepoxides usable in this invention may be represented by the formula:

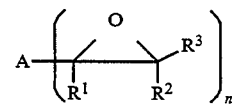

wherein A is an n-functional monomeric, oligomeric or polymeric anchor having n-epoxy groups pendently attached thereto; and wherein $R^1$, $R^2$ and $R^3$ are the same or different and each is selected from the group consisting of hydrogen, $C_1$–$C_4$ alkyl, $C_6$–$C_{10}$ aryl, $C_7$–$C_{11}$ aralkyl, and a mixture thereof; and wherein n is on the average, at least 2 and preferably greater than 2.

The preferred polyepoxides are low molecular weight copolymers of epoxy group-containing monomers such as glycidyl acrylate, glycidyl methacrylate, or a mixture thereof, with one or more epoxy-free olefinically-unsaturated monomers.

The epoxy-free olefinically-unsaturated monomer may be selected from the group consisting of acrylic acid esters with alcohols of 1 to 20 carbon atoms, methacrylic acid esters with alcohols of 1 to 20 carbon atoms, hydroxyethyl acrylate and methacrylate, hydroxypropyl acrylate and methacrylate, acrylic and methacrylic acid, acrylonitrile, methacrylonitrile, acrylamide, methacrylamide, styrene, alpha-methyl styrene, vinyl acetate, vinyl chloride, vinylidene chloride, dialkyl maleares having alkyls of 1 to 20 carbon atoms, dialkyl fumarates having alkyls of 1 to 20 carbon atoms, maleic anhydride, vinyl toluene, and a mixture thereof. The preferred epoxy-free monomer is selected from the group consisting essentially of methyl acrylate, methyl methacrylate, butyl acrylate, butyl methacrylate, ethylhexyl acrylate, ethylhexyl methacrylate, styrene, and a mixture thereof.

The copolymerization reaction may be carried out by known methods such as those described in U.S. Pat. Nos. 3,787,521 and 4,181,642, and in European Patent Nos. 480,120 and 256,369.

The preferred molecular weight of the polyepoxide is in the range of from about 1,000 to about 30,000. The epoxy equivalent weight is typically from about 50 to about 5,000 and the glass transition temperature (Tg) is from about 10° C. to about +120° C. Numerous examples of glycidyl methacrylate copolymers, sometimes referred to herein as GMA copolymers, are available commercially and are described further in EXAMPLE 2.

The Optional Cure Catalysts

The curable compositions of the invention are capable of curing without the aid of a cure catalyst. However, usually a cure catalyst is added to accelerate the cure rate, thereby reducing bake time.

The cure catalyst, when present, is selected from the general groups of basic and nucleophilic compounds, and include phosphines, phosphites, amines, oxides, alkoxides, hydroxides, carbonates, carboxylic salts, quaternary salts, and the like. Examples of suitable catalysts include alkyl phosphines such as tri-n-octyl phosphine, aryl phosphines such as triphenyl phosphine, alkyl phosphites such as tri-n-octyl phosphite, tertiary amines such as 1,4-diaza(2.2.2)bicyclooctane (DABCO), heterocyclic amines such as N-methyl imidazole and 4-N,N-dimethylaminopyridine, metal oxides such as calcium oxide, alkoxides such as methoxide, ethoxide or tertiary butoxide, metal hydroxides such as sodium or potassium hydroxide, metal carbonates such as sodium or potassium carbonate, carboxylic salts such as sodium acetate, quaternary salts such as triphenylphosphonium bromide, trimethyl benzylammonium chloride, and trimethylbenzylammonium bromide, metal alkoxides, such as sodium methoxide or potassium tertiary butoxide, and a mixture thereof.

Triphenylphosphine and DABCO are the preferred cure catalysts.

Ratios and Proportions of Ingredients

The ratios and proportions of the ingredients in the curable compositions of the invention are dependant primarily on the epoxy equivalent weight of the polyepoxide. When the polyepoxide used contains high epoxy levels, higher levels of the crosslinking agent are required. Usually, higher levels of the cure catalyst are also used to effect rapid cure.

Typically, the weight ratio of the polyepoxide to 1,3,5-tris-(2-carboxyethyl)isocyanate crosslinking agent is in the range of from about 98:2 to about 60:40, but preferably the ratio is from about 90:10 to about 75:25.

The amount of catalyst, if present, is typically in the range of from about 0.01 weight percent to about 5.0 weight percent of the total weight of the curable composition.

The curable compositions of the invention may also contain additional optional ingredients such as neutralizing amines, fillers, pigments, adhesion promoters, antiblistering additives, leveling additives, anticratering additives, stabilizing alcohols, antioxidants, ultraviolet light absorbers, plasticizers, mar-proofing agents, corrosion inhibitors, pigment wetting additives, or a liquid medium such as water, an organic solvent or a mixture of solvents.

Cured Coatings

When cured, the novel compositions of the invention form crosslinked films or objects having utility as coatings and as moldings, respectively.

The curable compositions of the invention are prepared by admixing the ingredients either to form curable powders for powder coatings applications, or, when a liquid medium is present, to form a curable solution or a suspension or an emulsion for liquid coatings or adhesives applications.

The admixture is then applied onto a substrate either, for example, by an electrostatic spraying technique in the case of powders, or it is applied by a technique such as spraying, padding, brushing, rollcoating, curtaincoating, flowcoating, electrocoating or dipping in the case of liquid coatings.

The coated substrate is then heated to cure the coating by crosslinking.

The unexpectedly superior properties of the curable compositions of the invention include the ability to cure at low temperatures such as 125° C. and the ability to produce films which have exceptionally good hardness such as a Knoop Hardness in the range of 15 to 30, exceptionally good solvent resistance such as an MEK Double Rub of at least 200 without marring, and a good balance of other film and resistance properties such as high gloss, good humidity resistance and salt spray resistance, and good adhesion.

Coatings with hardness in the range of 15 to 30 on the Knoop Hardness scale are advantageously usable as chip-, scratch- and mar- resistant automotive coatings and also as "general use" industrial coatings.

The following Examples illustrate the various embodiments of the invention.

EXAMPLE 1

Preparation of the Crosslinker 1,3,5-tris-(2-cyanoethyl)Isocyanurate

To a 1000 ml round bottom flask was added 64.5 g of isocyanuric acid along with 300 ml of water. A stir bar was added, and then 51 g of triethylamine was charged. The solution was stirred for 30 minutes at room temperature. Then 87 g of acrylonitrile was added to the solution. The solution was heated under reflux for 12 hours. The solution was then cooled to room temperature and the precipitated solid was filtered off. The dried solid weighed 133 g (92%). The melting point was 222°–224° C.

1,3,5-tris-(2-carboxyethyl) isocyanurate

To a 500 ml round bottom flask was added 94 g of tris-(2-cyanoethyl)isocyanurate along with 200 ml of a 36% solution of hydrochloric acid. The solution was heated under reflux for 4 hours, filtered through a fritted funnel, and then allowed to cool to room temperature. The crystals obtained weighed 105 g (98%). The melting point was 226°–228° C.

EXAMPLE 2

Commercial Polyepoxides

Several commercially available polyepoxides were characterized with respect to their molecular weight, equivalent weight, glass transition temperature, and composition. The results are summarized in TABLE 1.

TABLE 1

CHARACTERIZATION OF COMMERCIALLY AVAILABLE POLYEPOXIDES

| COMMERCIAL POLYEPOXIDES (Supplier) | $W_w$[1] | EW[2] | $T_g$[3] (°C.) | Composition[4] |
|---|---|---|---|---|
| Almatex PD7610 (Mitsui Toatsu) | 7000 | 510 | 45 | GMA/STY/MMA/others[5] |
| Almatex PD6100 (Mitsui Toatsu) | 12,500 | 1030 | 63 | GMA/STY/MMA/others[5] |
| Estron GMA-252 (Estron Chemicals) | 8300 | 250 | 36 | GMA/STY/MMA/others[5] |
| Blemmer CP-15 (Nippon Oil & Fat) | 12,300 | 1000 | 63 | |
| Blemmer CP-30P (NOF Corporation) | 10,300 | 530 | 62 | GMA/STY/MMA/others[5] |
| Blemmer CP-5SA (NOF Corporation) | 10,100 | 3000 | 96 | GMA/STY/MMA/others[5] |

[1]The molecular weight was determined by High Performance Size Exclusion Chromatography (HPSEC) with reference to sulfur as internal standard. Mw is the weight average molecular weight.
[2]The equivalent weight (EW) was supplied by the manufacturer.
[3]The glass transition temperature (Tg) was determined by Differential Scanning Calorimetry (DSC).
[4]The composition was determined by $^1$H Nuclear Magnetic Resonance Spectroscopy (NMR)
[5]GMA = Glycidyl Methacrylate
STY = Styrene
MMA = Methyl Methacrylate

EXAMPLE 3

Part A

Formulations 1 to 17 were prepared using glycidyl methacrylate (GMA) copolymers, and 1,3,5-tris-(2-carboxyethyl)isocyanurate (TCI) crosslinker and a cure catalyst as follows:

A 50 weight percent solution of the GMA copolymer, the TCI crosslinker, and the catalyst in N,N-dimethylformamide (DMF) was prepared and applied to Bonderite ® 1000 panels using a #32 wire cator applicator. (Bonderite ® is a registered trademark of Parker Chemical Company for phosphated cold rolled steel (CRS). "Iron phosphated CRS" is equivalent to "Bonderite 1000".) After drying at room temperature for a few minutes, the coated panels were placed horizontally in a mechanical forced stream convection oven at a specified temperature/time cure cycle. After curing the panels, the physical and resistance properties of the resulting coatings were measured.

Part B

The procedure in EXAMPLE 3, PART A was repeated with the exception that TCI crosslinker was replaced with dodecanedicarboxylic acid (DDA), a commonly used difunctional crosslinking agent. The Formulations obtained in this manner were Formulations 51 to 67. The physical and resistance properties of coatings in the comparative pairs are summarized in TABLES 2 to 18.

TABLE 2

COMPARISON OF TCI AND DDA CROSSLINKERS IN GMA COPOLYMER COATINGS
COMPARATIVE 1
Formulation(1) 82:18 GMA copolymer: crosslinker (TCI)/2% catalyst
Formulation(51) 82:18 GMA copolymer: crosslinker (DDA)/2% catalyst

| Coatings | (1) | (51) |
|---|---|---|
| MEK Resistance | 200/200 | 25/200 |
| Pencil Hardness | 4H | H-2H |
| Crosshatch Adhesion | 5 | 5 |
| Knoop Hardness | 20.6 | 14.6 |
| Impact Resistance F/R (in-lbs) | 20/10 | >100/>100 |
| Humidity Resistance (60° C.) | very good | excellent |
| Salt Spray Resistance | good | very good |

Cure Cycle = 20 minutes at 175° C.
GMA copolymer = Almatex PD7610, copolymer of glycidyl methacrylate.
TCI = 1,3,5-Tris-(2-carboxyethyl) isocyanurate.
DDA = Dodecanedicarboxylic acid.
Catalyst = triphenylphosphine, based on crosslinker.

TABLE 3

COMPARATIVE 2
Formulation(2) 82:18 GMA copolymer: crosslinker (TCI)/2% catalyst
Formulation(52) 82:18 GMA copolymer: crosslinker (DDA)/2% catalyst

| Coatings | (2) | (52) |
|---|---|---|
| Crosshatch Adhesion | 5 | 5 |
| Knoop Hardness | 23.0 | 16.6 |
| Impact Resistance F/R (in-lbs) | 40/10 | >100/>100 |
| Humidity Resistance (60° C.) | very good | excellent |
| Salt Spray Resistance | good | very good |

Cure Cycle = 20 minutes at 190° C.
GMA copolymer = Almatex PD7610, copolymer of glycidyl methacrylate.
Catalyst = triphenylphosphine, based on crosslinker.

TABLE 4

COMPARATIVE 3
Formulation(3) 69:31 GMA copolymer: crosslinker (TCI)/2% catalyst
Formulation(53) 69:31 GMA copolymer: crosslinker (DDA)/2% catalyst

| Coatings | (3) | (53) |
|---|---|---|
| MEK Resistance | 10/200 | 10/200 |
| Pencil Hardness | 5H | H-2H |
| Crosshatch Adhesion | 5 | 5 |

TABLE 4-continued

COMPARATIVE 3

Formulation(3) 69:31 GMA copolymer: crosslinker (TCI)/2% catalyst

Formulation(53) 69:31 GMA copolymer: crosslinker (DDA)/2% catalyst

| Coatings | (3) | (53) |
| --- | --- | --- |
| Knoop Hardness | 23.1 | 11.7 |
| Impact Resistance F/R (in-lbs) | 50/<10 | 130/130 |

Cure Cycle = 20 minutes at 175° C.
GMA copolymer = Estron GMA-252.
Catalyst = triphenylphosphine, based on crosslinker.

TABLE 5

COMPARATIVE 4

Formulation(4) 90:10 GMA copolymer: crosslinker (TCI)/2% catalyst

Formulation(54) 90:10 GMA copolymer: crosslinker (DDA)/2% catalyst

| Coatings | (4) | (54) |
| --- | --- | --- |
| MEK Resistance | 10/200 | 10/70 |
| Pencil Hardness | 4H-5H | 2H-3H |
| Crosshatch Adhesion | 5 | 5 |
| Knoop Hardness | 17.2 | 16.4 |
| Impact Resistance F/R (in-lbs) | 20/<10 | 40/<10 |
| Humidity Resistance (60° C.) | good (340h) | very good (430h) |
| Salt Spray Resistance | fair (430h) | very good (430h) |

Cure Cycle = 20 minutes at 175° C.
GMA copolymer = Almatex PD6100.
Catalyst = triphenylphosphine, based on crosslinker.

TABLE 6

COMPARATIVE 5

Formulation(5) 90:10 GMA copolymer: crosslinker (TCI)/2% catalyst

Formulation(55) 90:10 GMA copolymer: crosslinker (DDA)/2% catalyst

| Coatings | (5) | (55) |
| --- | --- | --- |
| MEK Resistance | 10/190 | 10/85 |
| Pencil Hardness | 4H-5H | 2H-3H |
| Crosshatch Adhesion | 5 | 5 |
| Knoop Hardness | 18.2 | 15.7 |
| Impact Resistance F/R (in-lbs) | 30/<10 | 30/<10 |
| Humidity Resistance (60° C.) | good (430h) | very good(430h) |
| Salt Spray Resistance | fair(430h) | very good(430h) |

Cure Cycle = 20 minutes at 190° C.
GMA copolymer = Almatex PD6100.
Catalyst = triphenylphosphine, based on crosslinker.

TABLE 7

COMPARATIVE 6

Formulation(6) 90:10 GMA copolymer: crosslinker (TCI)/2% catalyst

Formulation(66) 90:10 GMA copolymer: crosslinker (DDA)/2% catalyst

| Coatings | (6) | (66) |
| --- | --- | --- |
| MEK Resistance | 1/150 | 1/90 |
| Pencil Hardness | 4H | 2H-3H |
| Crosshatch Adhesion | 5 | 5 |
| Knoop Hardness | 16.0 | 12.9 |
| Impact Resistance F/R (in-lbs) | 20/10 | 40/10 |
| Humidity Resistance (60° C.) | fair(400h) | excellent(400h) |
| Salt Spray Resistance | poor(400h) | very good(400h) |

Cure Cycle = 20 minutes at 175° C.
GMA copolymer = Blemmer CP-15.
Catalyst = triphenylphosphine, based on crosslinker.

TABLE 8

COMPARATIVE 7

Formulation(7) 90:10 GMA copolymer: crosslinker (TCI)/2% catalyst

Formulation(57) 90:10 GMA copolymer: crosslinker (DDA)/2% catalyst

| Coatings | (7) | (57) |
| --- | --- | --- |
| MEK Resistance | 3/190 | 3/110 |
| Pencil Hardness | 4H | 3H |
| Crosshatch Adhesion | 5 | 5 |
| Knoop Hardness | 17.2 | 13.7 |
| Impact Resistance F/R (in-lbs) | 30/10 | 70/70 |
| Humidity Resistance (60° C.) | fair(440h) | excellent(400h) |
| Salt Spray Resistance | poor(400h) | very good(400h) |

Cure Cycle = 20 minutes at 190° C.
GMA copolymer = Blemmer CP-15.
Catalyst = triphenylphosphine, based on crosslinker.

TABLE 9

COMPARATIVE 8

Formulation(8) 96:4 GMA copolymer: crosslinker (TCI)/2% catalyst

Formulation(58) 96:4 GMA copolymer: crosslinker (DDA)/2% catalyst

| Coatings | (8) | (58) |
| --- | --- | --- |
| MEK Resistance | 1/35 | 1/3 |
| Pencil Hardness | 3H-4H | 4H-H |
| Crosshatch Adhesion | 4 | 4 |
| Knoop Hardness | 18.8 | 20.0 |
| Impact Resistance F/R (in-lbs) | <10/<10 | <10/<10 |
| Humidity Resistance (60° C.) | good(400h) | excellent(400h) |
| Salt Spray Resistance | poor(400h) | good(400h) |

Cure Cycle = 20 minutes at 175° C.
GMA copolymer = Blemmer CP-5SA.
Catalyst = triphenylphosphine, based on crosslinker.

TABLE 10

COMPARATIVE 9

Formulation(9) 96:4 GMA copolymer: crosslinker (TCI)/2% catalyst

Formulation(59) 96:4 GMA copolymer: crosslinker (DDA)/2% catalyst

| Coatings | (9) | (59) |
| --- | --- | --- |
| MEK Resistance | 1/90 | 1/5 |
| Pencil Hardness | 4H-5H | 4B-H |
| Crosshatch Adhesion | 4 | 4 |
| Knoop Hardness | 27.0 | 20.0 |
| Impact Resistance F/R (in-lbs) | <10/<10 | <10/<10 |
| Humidity Resistance (60° C.) | good(400h) | excellent(400h) |
| Salt Spray Resistance | poor(400h) | good(400h) |

Cure Cycle = 20 minutes at 190° C.
GMA copolymer = Blemmer CP-5SA.
Catalyst = triphenylphosphine, based on crosslinker.

TABLE 11

COMPARATIVE 10

Formulation(10) 82:18 GMA copolymer: crosslinker (TCI)/2% catalyst

Formulation(60) 82:18 GMA copolymer: crosslinker (DDA)/2% catalyst

| Coatings | (10) | (60) |
| --- | --- | --- |
| MEK Resistance | 20/200 | 20/200 |
| Pencil Hardness | 5H | 3H-4H |
| Crosshatch Adhesion | 5 | 5 |
| Knoop Hardness | 20.1 | 16.2 |
| Impact Resistance F/R (in-lbs) | 30/<10 | 160/100 |
| Humidity Resistance (60° C.) | very good(430h) | very good(430h) |
| Salt Spray Resistance | good(430h) | very good(430h) |

Cure Cycle = 20 minutes at 175° C.
GMA copolymer = Blemmer CP-30P.
Catalyst = triphenylphosphine, based on crosslinker.

TABLE 12

COMPARATIVE 11
Formulation(11) 82:18 GMA copolymer: crosslinker (TCI)/2% catalyst
Formulation(61) 82:18 GMA copolymer: crosslinker (DDA)/2% catalyst

| Coatings | (11) | (61) |
|---|---|---|
| MEK Resistance | 20/200 | 20/200 |
| Pencil Hardness | 5H | 3H-4H |
| Crosshatch Adhesion | 5 | 5 |
| Knoop Hardness | 21.2 | 16.4 |
| Impact Resistance F/R (in-lbs) | 40/<10 | 160/100 |
| Humidity Resistance (60° C.) | very good(430h) | very good(430h) |
| Salt Spray Resistance | good(430h) | very good(430h) |

Cure Cycle = 20 minutes at 190° C.
GMA copolymer = Blemmer CP-30P.
Catalyst = triphenylphosphine, based on crosslinker.

TABLE 13

COMPARATIVE 12
Formulation(12) 82:18 GMA copolymer: crosslinker (TCI)/1% catalyst
Formulation(62) 82:18 GMA copolymer: crosslinker (DDA)/1% catalyst

| Coatings | (12) | (62) |
|---|---|---|
| MEK Resistance | 10/200 | 30/200 |
| Pencil Hardness | 5H | H-2H |
| Crosshatch Adhesion | 5 | 5 |
| Knoop Hardness | 19.6 | 13.3 |
| Impact Resistance F/R (in-lbs) | 30/<10 | 120/50 |
| Humidity Resistance (60° C.) | good(430h) | very good(430h) |
| Salt Spray Resistance | fair(340h) | very good(430h) |

Cure Cycle = 20 minutes at 175° C.
GMA copolymer = Almatex PD 7610.
Catalyst = triphenylphosphine, based on total resin solids.

TABLE 14

COMPARATIVE 13
Formulation(13) 82:18 GMA copolymer: crosslinker (TCI)/1% catalyst
Formulation(63) 82:18 GMA copolymer: crosslinker (DDA)/1% catalyst

| Coatings | (13) | (63) |
|---|---|---|
| MEK Resistance | 10/200 | 40/200 |
| Pencil Hardness | 5H | 2H-3H |
| Crosshatch Adhesion | 5 | 5 |
| Knoop Hardness | 19.6 | 14.0 |
| Impact Resistance F/R (in-lbs) | 30/<10 | 140/70 |
| Humidity Resistance (60° C.) | good(430h) | very good(430h) |
| Salt Spray Resistance | fair(340h) | very good(430h) |

Cure Cycle = 20 minutes at 190° C.
GMA copolymer = Almatex PD 7610.
Catalyst = triphenylphosphine, based on total resin solids.

TABLE 15

COMPARATIVE 14
Formulation(14) 82:18 GMA copolymer: crosslinker (TCI)/2% catalyst
Formulation(64) 82:18 GMA copolymer: crosslinker (DDA)/2% catalyst

| Coatings | (14) | (64) |
|---|---|---|
| MEK Resistance | 1/200 | 1/25 |
| Pencil Hardness | 3H-4H | 2B-B |
| Crosshatch Adhesion | 3 | 4 |
| Knoop Hardness | 19.1 | 7.3 |
| Impact Resistance F/R (in-lbs) | 10/<10 | 10/<10 |

Cure Cycle = 20 minutes at 125° C.
GMA copolymer = Almatex PD 7610.
Catalyst = triphenylphosphine, based on crosslinker.

TABLE 16

COMPARATIVE 15
Formulation(15) 82:18 GMA copolymer: crosslinker (TCI)/2% catalyst
Formulation(65) 82:18 GMA copolymer: crosslinker (DDA)/2% catalyst

| Coatings | (15) | (65) |
|---|---|---|
| MEK Resistance | 5/200 | 5/190 |
| Pencil Hardness | 4H-5H | 4H-5H |
| Crosshatch Adhesion | 5 | 5 |
| Knoop Hardness | 20.1 | 22.0 |
| Impact Resistance F/R (in-lbs) | 20/<10 | 40/10 |

Cure Cycle = 20 minutes at 150° C.
GMA copolymer = Almatex PD 7610.
Catalyst = triphenylphosphine, based on crosslinker.

TABLE 17

COMPARATIVE 16
Formulation(16) 82:18 GMA compolymer:crosslinker(TCI)
Formulation(66) 82:18 GMA compolymer:crosslinker(DDA)

| Coating | (16) | (66) |
|---|---|---|
| MEK Resistance | 30/200 | 5/200 |
| Pencil Hardness | 5H | 2H |
| Crosshatch Adhesion | 5 | 5 |
| Knoop Hardness | 18.8 | 16.9 |
| Impact Resistance F/R (in-lbs) | 40/<10 | 100/100 |

Cure Cycle = 20 minutes at 175° C.
GMA Copolymer = Almatex PD 7610

TABLE 18

COMPARATIVE 17
Formulation(17) 82:18 GMA compolymer:crosslinker(TCI)
Formulation(67) 82:18 GMA compolymer:crosslinker(DDA)

| Coating | (17) | (67) |
|---|---|---|
| MEK Resistance | 90/200 | 5/200 |
| Pencil Hardness | 5H | 2H |
| Crosshatch Adhesion | 5 | 5 |
| Knoop Hardness | 21.4 | 14.2 |
| Impact Resistance F/R (in-lbs) | 40/<10 | 30/30 |

Cure Cycle = 20 minutes at 190° C.
GMA Copolymer = Almatex PD 7610

Although the present invention has been described with reference to certain preferred embodiments, it is apparent that modifications and variations thereof may be made by those skilled in the art without departing from the scope of this invention as defined by the appended claims.

We claim:

1. A curable powder coating composition comprising:
   (i) 1,3,5-tris-(2-carboxyethyl)-isocyanurate;
   (ii) a polyepoxide derived from the copolymerization of:
      (a) an epoxy group-containing olefinically-unsaturated monomer; and
      (b) an epoxy-free olefinically-unsaturated monomer; and optionally
   (iii) a cure catalyst.

2. The curable composition of claim 1 wherein the epoxy group-containing monomer (a) is selected from the group consisting of glycidyl acrylate, glycidyl methacrylate, and a mixture thereof.

3. The curable composition of claim 1 wherein the epoxy-free monomer is selected from the group consisting of acrylic acid esters with alcohols of 1 to 20 carbon atoms, methacrylic acid esters with alcohols of 1 to 20 carbon atoms, hydroxyethyl acrylate, hydroxyethyl methacrylate, hydroxypropyl acrylate, hydroxypropyl methacrylate, acrylic acid, methacrylic acid, acrylonitrile, methacrylonitrile, acrylamide, methacrylamide, styrene, alpha-methyl styrene, vinyl acetate, vinyl chloride, vinylidene chloride, maleic anhydride, dialkyl maleares having alkyls of 2 to 20 carbon atoms, dialkyl fumarates having alkyls of 1 to 20 carbons atoms, vinyl toluene, and a mixture thereof.

4. The curable composition of claim 1 wherein the polyepoxide is derived from the copolymerization of an epoxy group-containing monomer selected from the group consisting of glycidyl acrylate, glycidyl methacrylate, and a mixture thereof; and a epoxy-free monomer selected from the group consisting of methyl acrylate, methyl methacrylate, butyl acrylate, butyl methacrylate, ethylhexyl acrylate, ethylhexyl methacrylate, styrene, and a mixture thereof; said copolymer having a weight average molecular weight in the range of from about 1,000 to about 30,000; an epoxy equivalent weight of from about 50 to about 5,000; and a glass transition temperature of from about 10° C. to about 120°° C.

5. The curable composition of claim 1 wherein a cure catalyst is present and is selected from the group consisting of alkyl and aryl phosphines, alkyl and aryl phosphites, tertiary alkyl and aryl amines, heterocyclic amines, alkoxides, metal oxides, metal hydroxides, metal carbonates, metal carboxylates, quaternary ammonium salts, quaternary phosphonium salts, metal alkoxides and a mixture thereof.

6. The curable composition of claim 5 wherein the cure catalyst is selected from the group consisting of triphenyl phosphine, tri-n-octyl phosphine, triphenyl phosphite, tri-n-octyl phosphite, N-methyl imidazole, 4-N,N-dimethylaminopyridine, 1,4-diaza(2.2.2)bicyclooctane, calcium oxide, sodium hydroxide, potassium hydroxide, sodium acetate, methyl triphenylphosphonium bromide, trimethylbenzylammonium bromide, trimethyl-benzylammonium chloride, sodium methoxide and a mixture thereof.

7. The curable composition of claim 5 wherein the cure catalyst is triphenyl phosphine.

8. The curable composition of claim 1 wherein the weight ratio of the polyepoxide to 1,3,5-tris-(2-carboxyethyl)isocyanurate is from about 98:2 to about 60:40.

9. The curable composition of claim 8 wherein the weight ratio of the polyepoxide to 1,3,5-tris-(2-carboxyethyl)-isocyanurate is from about 90:10 to about 75:25.

10. The curable composition of claim 1 wherein a catalyst is present in an amount of from about 0.01 weight percent to about 5.0 weight percent of the total weight of the curable composition.

11. A curable powder coating composition comprising:
(i) 1,3,5-tris -(2-carboxyethyl) isocyanurate;
(ii) a polyepoxide derived from the copolymerization of:
(a) an epoxy group-containing olefinically-unsaturated monomer selected from the group consisting of glycidyl acrylate, glycidyl methacrylate, and a mixture thereof; and
(b) an epoxy-free olefinically-ununsaturated monomer selected from the group consisting of methyl acrylate, methyl methacrylate, butyl acrylate, butyl methacrylate, ethylhexyl acrylate, ethylhexyl methacrylate, styrene, and a mixture thereof; said copolymer having a weight average molecular weight in the range of from about 1,000 to about 30,000; an epoxy equivalent weight of from about 50 to about 5,000; and a glass transition temperature of from about 10° C. to about 120° C.; and optionally
(iii) a cure catalyst selected from the group consisting of alkyl and aryl phosphines, alkyl and aryl phosphites, tertiary alkyl and aryl amines, heterocyclic amines, metal oxides, alkoxides, metal hydroxides, quaternary ammonium salts, quaternary phosphonium salts, metal alkoxides, metal carbonates, metal carboxylates and a mixture thereof.

12. The curable composition of claim 11 wherein a cure catalyst is present and is selected from the group consisting of triphenyl phosphine, tri-n-octyl phosphine, triphenyl phosphite, tri-n-octyl phosphite, N-methyl imidazole, 4-N,N-dimethylamino pyridine, 1,4-diaza-(2.2.2)bicyclooctane, calcium oxide, sodium hydroxide, potassium hydroxide, sodium acetate, methyl triphenyl-phosphonium bromide, trimethylbenzylammonium bromide, trimethylbenzylammonium chloride, and a mixture thereof.

13. The curable composition of claim 11 wherein a cure catalyst is present and is triphenylphosphine.

14. A curable powder coating composition capable of producing cured films which have a Knoop Hardness in the range of from at least 15 to about 30, comprising:
(i) 1,3,5-tris-(2-carboxyethyl) isocyanurate;
(ii) a polyepoxide derived from the copolymerization of:
(a) an epoxy group-containing olefinically-unsaturated monomer; and
(b) an epoxy-free olefinically-unsaturated monomer; and optionally
(iii) a cure catalyst.

15. A curable powder coating composition capable of producing cured films which have a Knoop Hardness in the range of from at least 15 to about 30, comprising:
(i) 1,3,5-tris-(2-carboxyethyl) isocyanurate;
(ii) a polyepoxide derived from the copolymerization of:
(a) an epoxy-group containing olefinically-unsaturated monomer; and
(b) an epoxy-free olefinically-unsaturated monomer; and
(iii) a cure catalyst.

16. A curable powder coating composition capable of producing cured films which have a Knoop Hardness in the range of from at least 15 to about 30, comprising:
(i) 1,3,5-tris-(2-carboxyethyl) isocyanurate;
(ii) a polyepoxide derived from the copolymerization of:
(a) an epoxy-group containing olefinically-unsaturated monomer selected from the group consisting of glycidyl acrylate, glycidyl methacrylate, and a mixture thereof; and
(b) an epoxy-free olefinically-unsaturated monomer selected from the group consisting of methyl methacrylate, butyl acrylate, styrene, and a mixture thereof;
said copolymer having a weight average molecular weight in the range of from about 1,000 to about 30,000; an epoxy equivalent weight of from about 50 to about 5,000; and a glass transition temperature of from about 10° C. to about 120° C.; and optionally
(iii) triphenyl phosphine cure catalyst.

17. A cured film or object prepared by heat curing the composition of claim 1.

* * * * *